United States Patent Office 3,344,154
Patented Sept. 26, 1967

3,344,154
1,5-BIS(2,4-DICHLOROBENZAMIDO)-
ANTHRAQUINONE
Gerald R. Aldridge, Elizabeth, N.J., assignor to E. I. du Pont de Nemours and Company, Wilmington, Del., a corporation of Delaware
No Drawing. Filed Feb. 11, 1963, Ser. No. 257,776
1 Claim. (Cl. 260—377)

This invention relates to the novel compound 1,5-bis (2,4-dichlorobenzamido) anthraquinone and more particularly to a novel yellow pigment, of excellent lightfastness and bleed resistance, consisting of this compound in substantially pure, finely divided form.

Anthraquinone derivatives are used as dyes in the textile industry, but these dyes have not been used appreciably as pigments because of serious deficiencies in lightfastness and bleed properties. For example, 1,5-bis(benzamido)anthraquinone (Colour Index No. 61725) is widely used as a vat dye for textiles but is not suitable for pigment applications because it lacks lightfastness and tends to bleed in coating compositions. United States Patent 2,420,453 describes 1,5-bis(p-bromo-benzamido)anthraquinone, 1,5 - bis(3,4-dichlorobenzamido)anthraquinone, and 1,5-bis(p-chlorobenzamido)anthraquinone, each of which shows poor durability on outdoor exposure in coating compositions and is of little value as a pigment. FIAT Report 1313 refers to preparation of 1,5-bis(3,5-dichlorobenzamido)anthraquinone; tests show that this compound has inadequate lightfastness for pigmentary use. A survey of a considerable number of substituted 1,5-bis-substituted anthraquinones has confirmed the general inadequacy of this class of compounds as pigments because of poor lightfastness.

Now in contrast to the above-mentioned deficiencies of anthraquinone derivatives as pigments it has been found that the novel compound, 1,5-bis(2,4-dichlorobenzamido) anthraquinone, surprisingly, has outstanding pigmentary properties. This compound has excellent lightfastness and general durability in coating compositions, plastics, rubber, paper, and other usual pigment applications, and is also free of the bleed which characterizes even closely related compounds. It has the further advantage over many common yellow pigments that it does not contain any lead or other heavy metals. In contrast to chrome yellow pigments, it is highly resistant to both alkali and acid; unlike widely used metal complex compound pigments which lose their complexed metal when dispersed in acidic coating compositions, with resulting impairment of tinctorial properties and durability, the new compound contains no complexed metal and is not subject to this failure.

The novel compound can be prepared by the reaction of one mol of 1,5-diaminoanthraquinone with two mols of 2,4-dichlorobenzoyl chloride or 2,4-dichlorobenzamide in a suitable fluid reaction medium at elevated temperature and in the presence of an acid acceptor. The product is freed of impurities harmful to lightfastness and bleed, if any are present, and is pulverized by conventional means to a particle size suitable for pigment applications.

For optimum yield of the desired product, it is essential that the reaction be carried out at elevated temperatures, i.e., of the order of 120° C. or greater, a preferred temperature being 150° C. At room temperature considerable quantities of 1-amino-5-(2,4-dichlorobenzamido) anthraquinone are formed.

An excess of dichlorobenzoyl chloride over the theoretical proportions favors the formation of the desired 1,5-bis(2,4-dichlorobenzamido)anthraquinone in the reaction between one mol of 1,5-diaminoanthraquinone and two mols of 2,4-dichlorobenzoyl chloride. The preferred excess is approximately 10% to 50% over the theoretical quantity, but larger amounts may be used without detriment.

Potassium carbonate or sodium carbonate is used as an acid aceptor in the reaction to neutralize the hydrochloric acid formed. Other bases can also be used, but strong alkalies such as sodium hydroxide and potassium hydroxide are not preferred because of their tendency to hydrolyze the substituted benzoyl chloride or benzamide used in the synthesis. It is preferred to use at least a slight excess of base, and amounts up to 2 to 3 times the theoretical amount may be used.

The preferred fluid medium for the reaction is nitrobenzene, but other high boiling liquids such as trichlorobenzene, mixtures of biphenyl and diphenyl oxide (especially the eutectic mixture containing 26.5% of biphenyl), tetramethylene sulfone, kerosene, and the like, can also be used. The quantity of reaction medium is not critical but should be sufficient to provide a stirrable slurry.

For optimum pigment quality, it is essential that any impurities that produce bleeding and poor lightfastness be removed from the crude product. This can be done by extraction with nitrobenzene as described in Example 1, below, by extraction with dimethlformamide, chlorobenzene, and the like, or by selective extraction with sulfuric acid. Hypochlorite treatment is also useful for purifying the product, as described in Example 2.

Drying and particle size reduction of the pigment, if desired, is carried out in conventional fashion. The pigment can be transferred directly from the wet stage to a coating composition by means of the "flushing procedures" known to those skilled in the art.

The invention will be better understood by reference to the following illustrative examples. The term "parts" in these examples refers to measurements on a weight basis.

*Example 1*

To make a product of the invention in crude form, 23.8 parts of 1,5-diaminoanthraquinone, 46 parts of 2,4-dichlorobenzoyl chloride, and 34.5 parts of potassium carbonate are added to 300 parts of nitrobenzene in a suitable reaction vessel and the mixture is heated at 150°–155° C. under a reflux condenser for 3 hours with agitation. The mixture is then cooled to 120° C. and filtered. The presscake is washed with nitrobenzene and then with ethanol, following which it is extracted with hot water (400 parts) by stirring as a slurry in the water. The slurry is filtered hot, and the presscake is washed with water and then dried, 59 parts of dry product in the form of crude material being obtained.

For optimum properties as a pigment, the crude material needs to be purified to remove impurities which contribute to poor lightfastness and bleed. The purification is carried out as follows: the 59 parts of crude product is boiled under a reflux condenser for ½ hour with 1440 parts of nitrobenzene and the slurry is then filtered hot, the presscake is washed with nitrobenzene and then with ethanol, and finally dried in an oven at approximately 100° C. A yield of 53.5 g. of partially purified product is obtained. This product is purified further by slurrying in boiling dimethylformamide (1,000 parts) for one hour, filtering hot, washing with dimethylformamide and then with ethanol, and then drying. A yield of 51 parts dried product is obtained. This material is purified still further by stirring it in boiling nitrobenzene for ½ hour, then filtering the hot slurry, and washing the presscake with nitrobenzene, then with ethanol, and finally drying the washed presscake. A yield of 39 parts of highly purified product is obtained.

The analysis of the product after two recrystallizations from nitrobenzene compares as follows with the theoretical analysis for 1,5-bis(2,4-dichlorobenzamido)anthraquinone calculated for the formula $C_{28}H_{14}Cl_4N_2O_4$:

|  | Found | Theory |
|---|---|---|
| Percent Carbon | 57.3 | 57.6 |
| Percent Hydrogen | 2.2 | 2.4 |
| Percent Nitrogen | 4.4 | 4.8 |
| Percent Chlorine | 23.2 | 24.3 |

When the product is dispersed in coating compositions, it produces bright yellow finishes of excellent quality. Particularly noteworthy is the outstanding lightfastness and bleed resistance as compared to prior art yellow organic pigments.

For many applications, it is preferred to decrease the particle size of this product to increase its tinting strength and increase transparency. This may be done by any convenient means. Among the suitable methods are milling in acetone (see U.S. Patent 2,556,727), milling in saturated aqueous slurries of finely crystalline inorganic salts (see U.S. Patent 2,816,114), acid pasting, milling with aluminum sulfate in the presence of a chlorinated hydrocarbon (see U.S. Patent 3,030,370) and milling with sodium chloride. When pigment which has been reduced in particle size is dispersed in a coating composition, it yields a somewhat darker, more transparent masstone than was obtained with the product prior to the size reduction step, and a tint which is somewhat more strongly colored than is obtained with a like quantity of the larger particle size product. On exposure in a "Weather-Ometer" or in a "Fadeometer," coating compositions pigmented with the purified product show excellent durability with substantially no change during exposures which cause a closely related product, 1,5-bis(benzamido)anthraquinone, to fail badly.

*Example 2*

An alternative procedure which includes purification of the product by hypochlorite treatment is as follows:

To make a crude reaction product, 47.6 parts (0.2 mol) of 1,5-diaminoanthraquinone, 53 parts (0.5 mol) of technical sodium carbonate, and 126 parts (0.6 mol) of 2,4-dichlorobenzoyl chloride are heated for three hours in nitrobenzene at 150–160° C. with agitation. The slurry is filtered hot (approximately 150° C.) and washed with 1200 parts of nitrobenzene previously heated to 150° C.

The washed presscake is then reslurried in 1200 parts of nitrobenzene and the slurry is boiled for ½ hour, with reflux, then cooled to 170° C., filtered, and the filtrate is washed with 600 parts of nitrobenzene which has been heated previously to 170° C. The washed presscake is then slurried in 3000 parts of water, 159 parts of sodium carbonate is added, and the nitrobenzene is removed from the slurry by steam distillation, using vigorous agitation to produce a finely divided pigment slurry.

After completion of the distillation, the slurry is cooled to 80–90° C. and 77 parts of aqueous 50% sodium hydroxide solution is added to produce a pH of 11 or higher in the slurry. At 80–90° C., 641 parts of 5% sodium hypochlorite solution is then added to the alkaline slurry and the slurry is stirred for approximately one hour with addition of more hypochlorite as necessary to maintain an excess as indicated by test with starch-potassium iodide paper. The slurry is then filtered hot (80–90° C.), washed to substantial neutrality, and dried.

A yield of 86 parts of product is obtained which represents 74% of the theoretical yield. The product is a yellow pigment of excellent durability, bleed resistance, and tinctorial qualities. For optimum pigment strength, it can be reduced in particle size by any convenient method.

*Example 3*

This example shows the preparation of 1,5-bis(2,4-dichlorobenzamide)anthraquinone from 2,4-dichlorobenzamide and 1,5-dichloroanthraquinone. To make the crude reaction product, 63 parts (0.33 mol) of 2,4-dichlorobenzamide is stirred into solution at approximately 165° C. in 40 parts of nitrobenzene, in a glass-lined reactor equipped with an agitator and a cooled reflux condenser. To the solution thus obtained is added 20 parts (0.072 mol) of 1,5-dichloroanthraquinone, 20 parts (0.145 mol) of potassium carbonate, and 20 parts (0.07 mol) of cuprous bromide. The mixture is heated to 170–175° C. and maintained at that temperature for approximately 10 hours; 250 parts of nitrobenzene is then added and the mixture is stirred for 3 hours at 170–175° C.; the mixture is then cooled to room temperature, filtered, and the filter cake is washed with nitrobenzene, then with alcohol, and finally with hot water. Finally, the presscake is washed with 810 parts of hot 5 molar hydrochloric acid to remove copper salts.

The presscake is then transferred to a glass flask, 1000 parts of water and 65 parts of sodium carbonate are added and steam distillation is carried out to remove nitrobenzene, the mixture being vigorously agitated during the distillation. Upon completion of removal of nitrobenzene, the still slurry is cooled to 80–90° C. and 31 parts of 50% sodium hydroxide solution is added. The pH should be 11 or greater. At 80–90° C., 407 parts of a 5% aqueous solution of sodium hypochlorite is added and the mixture is stirred for an hour at 80–90° C. adding additional 5% sodium hypochlorite solution if necessary to maintain an excess of hypochlorite. The slurry is then filtered hot and washed to essential freedom from base with water, and dried. Twenty-two parts of product are obtained, corresponding to approximately 52% of the theoretical yield. Physical and chemical tests of the product show it to consist predominantly of 1,5 - bis(2,4 - dichlorobenzamido)anthraquinone, but of a somewhat lower degree of purity than is obtained in Example 1.

I claim:

1,5-bis(2,4-dichlorobenzamido)anthraquinone.

References Cited

UNITED STATES PATENTS

| 2,420,453 | 5/1947 | Sutter | 260—377 |
| 2,567,821 | 9/1951 | Moergeli | 260—377 |

RICHARD K. JACKSON, *Primary Examiner.*